Aug. 27, 1946.    A. H. BENNETT ET AL    2,406,526
MICROSCOPE
Filed Aug. 23, 1943    5 Sheets-Sheet 1

INVENTOR.
ALVA H. BENNETT
OSCAR W. RICHARDS
BY Raymond A. Laquin
ATTORNEY

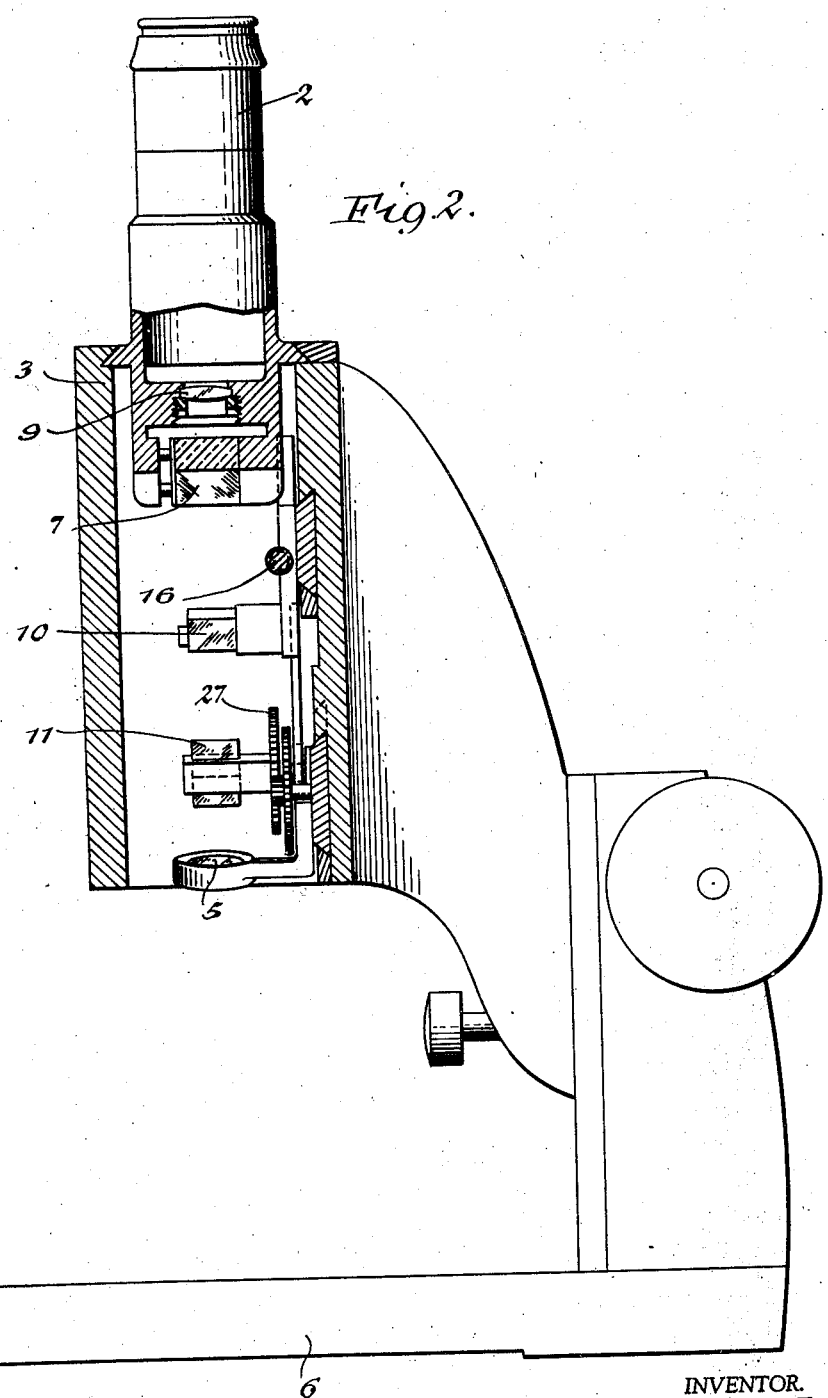

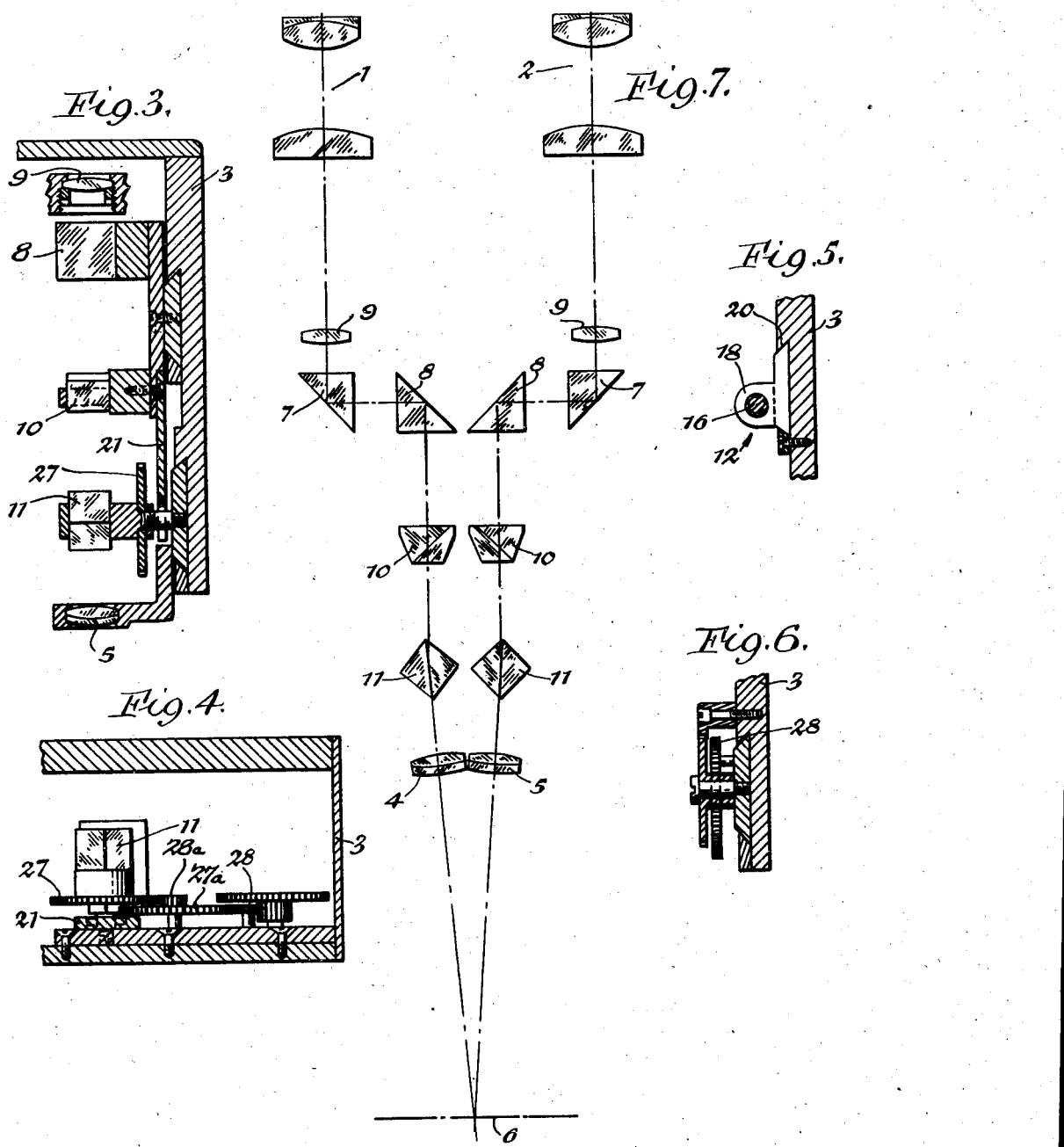

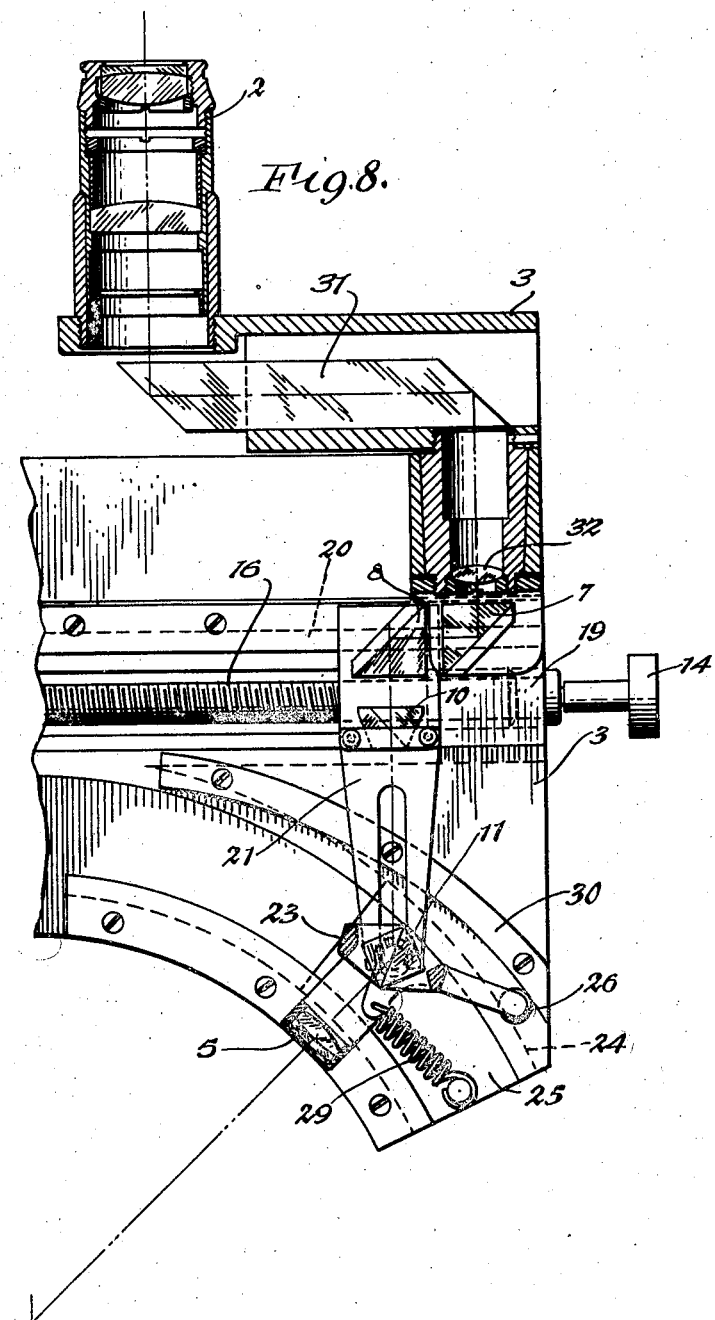

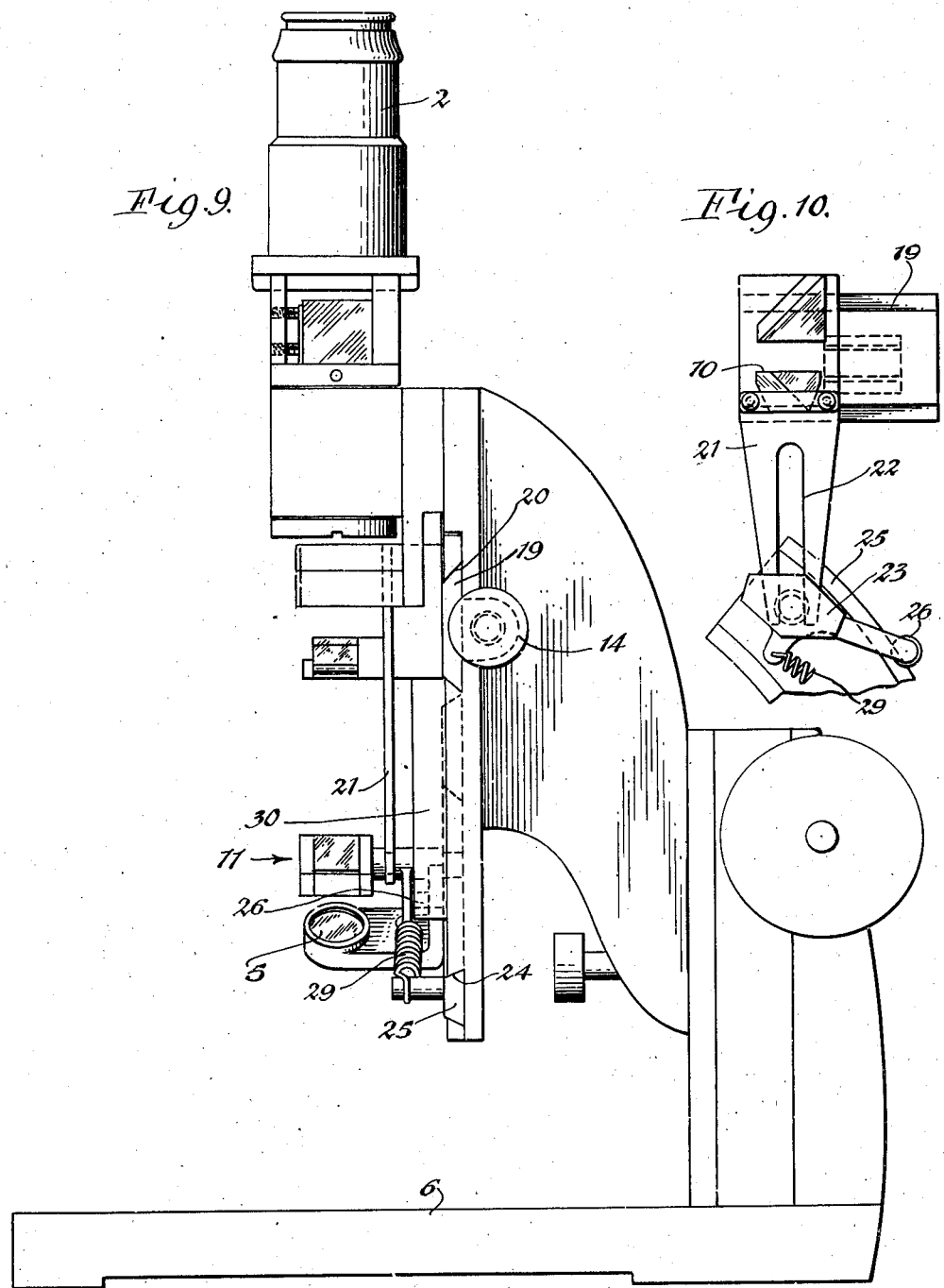

Patented Aug. 27, 1946

2,406,526

UNITED STATES PATENT OFFICE 2,406,526

MICROSCOPE

Alva H. Bennett, Kenmore, and Oscar W. Richards, Snyder, N. Y., assignors, by mesne assignments, to American Optical Company, Southbridge, Mass., a voluntary association Application August 23, 1943, Serial No. 499,596

11 Claims. (Cl. 88—39)

This invention relates to microscopes or the like and has particular reference to a new and improved stereoscopic binocular biobjective type microscope, that is, a microscope for obtaining a stereoscopic effect in the viewing of the object or specimen, and has particular reference to such a device wherein the degree or amount of stereoscope effect may be easily and quickly altered without any change in the position of the oculars or eyepieces.

An object of the invention is to provide a binocular microscope whereby a stereoscopic view of the object under examination may be obtained and with which different degrees of stereoscopy, hyper, ortho, or hypostereoscopy, that is, the apparent depth of the object may be enhanced or reduced easily and quickly without interfering with the position or setting of the oculars or eyepieces for the particular interpupillary measurement of the observer.

An object of the present invention is to provide a stereoscopic binocular microscope which allows the viewing of an object with different degrees of stereoscopic appearance without change of objectives or magnification and without interfering with the interpupillary distance of the observer.

Referring to the drawings:

Fig. 2 is a sectional view taken on line 2—2 of Fig. 1 looking in the direction of the arrows;

Fig. 3 is a sectional view taken on line 3—3 of Fig. 1 looking in the direction of the arrows;

Fig. 4 is a sectional view taken on line 4—4 of Fig. 1 looking in the direction of the arrows;

Fig. 5 is a sectional view taken along line 5—5 of Fig. 1 looking in the direction of the arrows;

Fig. 6 is a sectional view taken along line 6—6 of Fig. 1 looking in the direction of the arrows;

Fig. 7 is a diagrammatic view showing the optical system for form of invention shown in Fig. 1;

Fig. 8 is a view similar to Fig. 1 of another form of the invention and showing but one half thereof.

Fig. 9 is a side or end view of the construction shown in Figs. 8; and

Fig. 10 is a view showing part of the arrangement shown in Fig. 9.

Figure 1:
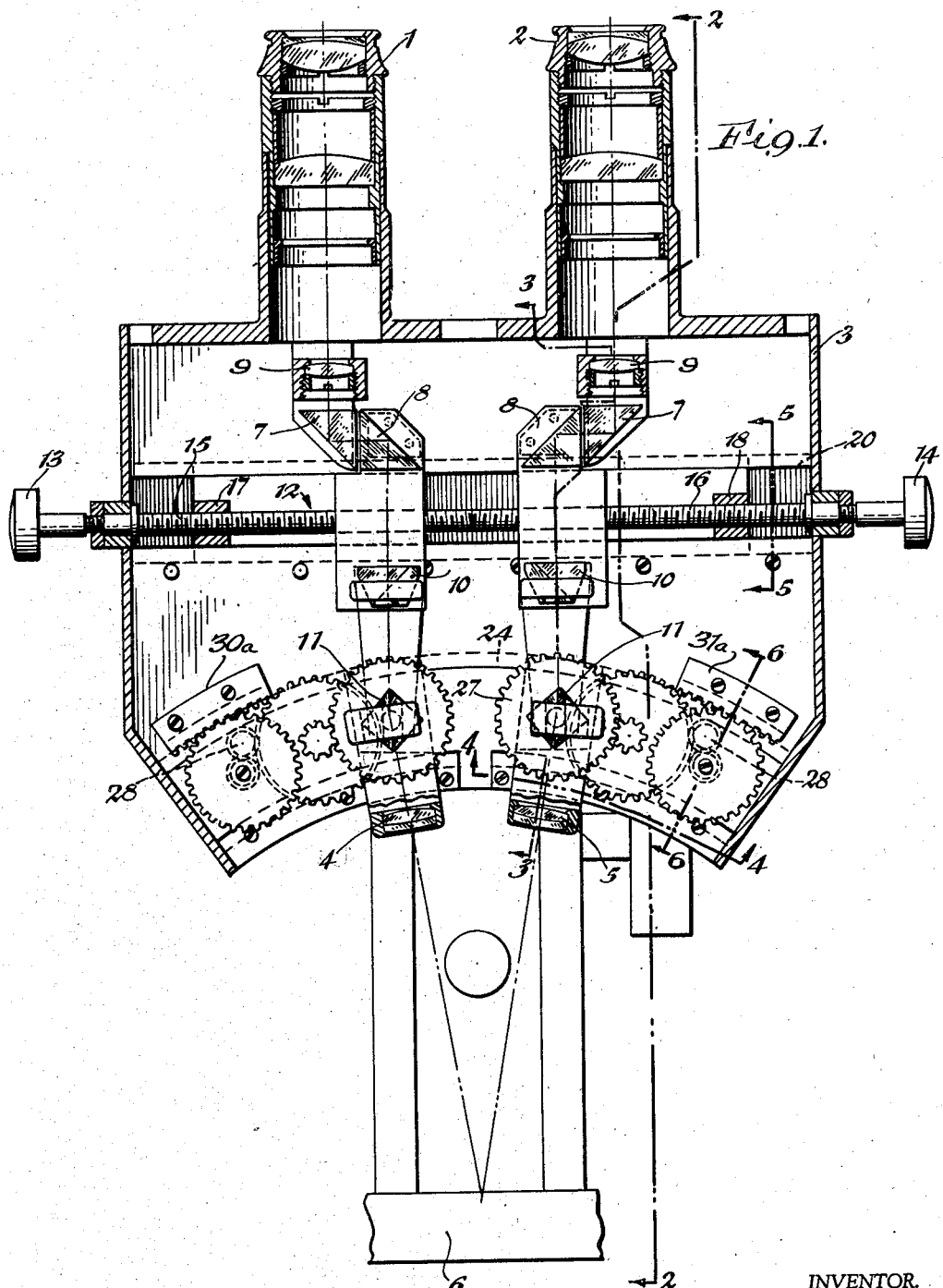
Fig. 1 is a front view partially in section of a microscope embodying the invention.

In the past considerable efforts have been expended toward obtaining microscopes of the binocular biobjective type which would give a stereoscopic image or reveal depth in the specimen. In the design and construction of such instruments however it has been necessary that the amount of stereoscopic effect be fixed because in order to obtain any different stereoscopic effect it was necessary that the interpupillary distance, that is, the distance between the oculars or eyepieces be also altered.

It will be apparent that this allowed no useful adjustment of the stereoscopic effect because if the interpupillary distance were altered appreciably the oculars would no longer be aligned with the two eyes as required for viewing through the microscope.

The best known stereoscopic microscopes were first a construction in which two separate microscopes were employed with the microscopes being held in a rack. Next a form was constructed wherein two microscopes were adjustably hinged together. It will be seen that with either of the above constructions that it was impossible to alter the stereoscopic effect of the instrument to any extent without simultaneously disturbing or interfering with the interpupillary distance or setting of the oculars and therefore to obtain any appreciable change in stereoscopic effect was not practical.

The next form and which is the form now generally employed is a construction wherein the angle between the optical axes of the objectives is fixed and the objectives are fixed relative to each other so that it is not possible to obtain any change in the degree of stereoscopic effect with the instrument, that is, it is not possible to control the apparent perspective of the image seen in the microscope.

It is pointed out that in many cases it would be highly advantageous to be able to study different objects with different degrees of stereoscopic effect and in some cases it would be highly advantageous to be able to observe or study a single object with different degrees of stereoscopic effect and without interfering with the interpupillary distance or setting of the eyepieces or oculars.

It therefore is an object of the present invention to provide a new and improved means and method whereby a single object or separate objects may be viewed with different degrees of stereoscopic effect and wherein the apparent depth or stereoscopic effect can be controlled and changed easily and quickly during the actual observation of the specimen without interfering with the interpupillary setting of the oculars.

Referring more particularly to the drawings wherein similar reference characters designate corresponding parts throughout the several views, the form of the invention shown in Fig. 1 comprises a pair of eyepieces or oculars 1 and 2 mounted on the upper edge of the casing 3 and which oculars 1 and 2 are adjustable relative to each other in order that they may be adjusted to the particular interpupillary distance of the user of the instrument.

These oculars 1 and 2 are of the conventional type and the means (not shown) for adjusting the interpupilllary distance by adjusting said oculars relative to each other may also be of the conventional type.

There is also provided a pair of objectives 4 and 5 which are optically aligned with the oculars 1 and 2 respectively and which are adapted to focus on a specimen under examination on the stage 6.

Optically aligned with the ocular 1 are the reflecting prisms 7 and 8, the lens 9, the direct vision inverting prism 10 and the double dove prism 11. The prism 8 and prism 10 are adjustably mounted as a unit relative to the prism 7 and are adapted to be adjusted as a unit by means of the threaded member 12 which has the knobs 13 and 14 at the opposite sides of the casing respectively and which has the portions 15 and 16 oppositely threaded into the threaded blocks 17 and 18. Optically aligned with the ocular 2 are reflecting prisms 7 and 8, lens 9 and direct vision inverting prism 10 and double dove prism 11 corresponding to these previously described in connection with the ocular 1. It is pointed out that the system is a binocular biobjective system for obtaining stereoscopic vision. The two lens systems are identical and may be adjusted relative to each other by means of the knobs 13 and 14 as described above.

The slide member 19 as shown in Fig. 10 is adjustably mounted in the dove tail slide 20 and is adapted to be actuated therein by means of the knobs 13 and 14 which actuate the threaded member 12 and simultaneously with the adjustment of the slide 19 the member 21 which has the forked portion 22 adjacent the lower end thereof causes adjustment of the support 23 for the dove prism 11 which causes said prism support and prism to be adjusted according to the direction of movement of the member 22 and also causes movement of the support 25.

In both the form shown in Fig. 1 and the form shown in Fig. 8, the support 25 is slideably positioned in the dove tail slide 24 and in the form shown in Fig. 1 such movement by means of the gears 27, 27a, 28 and 28a causes rotation of the dove prism 11 to proper angular relation. In the form shown in Figs. 8 and 10 the cam rider 26 causes pivotal adjustment of the double dove prism 11 angularly relative to the optical axis of the prism 10 and lens 32 and simultaneously adjusts the optical axis of the objectives 4 and 5 according to the amount of adjustment of the screw member 12 to vary the angle from which the specimen is observed which permits true, increased or decreased depth or the appearance of the third dimension.

The gears 27, 27a, 28 and 28a as shown in Figs. 1 and 4 are mounted on the sliding support 25 and are adapted to be moved or adjusted therewith. The racks 30a and 31a are secured to the casing 3 and each rack is always in mesh with its respective gear 28 so that movement of the sliding support 25 will automatically cause rotation of the gears 28 and thereby cause rotation of the dove prisms 11 through the rotation of the gears 27a, 28a and 27 which gear is directly connected to the mount for the prism 11.

The form of the invention shown in Fig. 8 will give a wider range of change in stereoscopic effect because the adjustment is not limited by the adjustment of the oculars for interpupillary distance as is the form shown in Fig. 1.

The prisms 7 in the form shown in Fig. 1 are each mounted for adjustment with its respective ocular 1 or 2 and is adapted to be automatically horizontally adjusted upon adjustment of its respective ocular.

In the form of invention shown in Fig. 8 the prism 7 is fixed as may be the lens 32 but the prism member 31 is pivotable about the axis of lens 32 as is the ocular in order to adjust the oculars to desired interpupillary distance.

The direct vision inverting prism 10 is of the type known as Pechan prism and serves to invert the image in one direction only.

The form of the invention shown in Figs. 8 and 10 are substantially the same as the form shown in Fig. 1 except that the housing of the prism member 31 is pivoted and the range of travel of the prisms 8 is increased, the prism 7 remaining fixed during pivotal movement of the prism member 31 and lens 32.

Also this form is provided with the cam 26 and rider 30 in place of the gear system shown with the prior form. Both forms contain the objectives 4 and 5 which are interchangeable with other objectives to obtain the desired magnification.

It will be seen from Fig. 8 that rotation of the member 14 will cause rotation of the threaded member 16 thereby causing movement of the member 21 and prisms 8 and 10 with the direction of such movement depending upon the direction of turning of the knob 14 and threaded member 16 and the yoke member 21 will move the prism support 25 in the dove tail 24. The prism 11 on its support 23 is carried bodily in the same direction by the prism support 25 with the cam rider 26 resiliently urged against the face of the cam member or track 30 by the spring 29 to properly angle said prism member 11 and objective 4 or 5.

In Fig. 7 is shown the optical layout for the form of device shown in Fig. 1.

The dove prisms 11 serve to turn the light rays coming from the objective into the axis of prism 10 and said prisms 11 may be angularly adjusted according to its position.

The prism 31 and lens 32 and mechanical arrangement therefore as shown in the form of the invention of Fig. 8 could be employed in the form of invention shown in Fig. 1 and in fact would considerably increase the range of depth vision in that form. In this case the lens 9 would be replaced by the lens 32.

In the forms of invention shown the conventional coarse and fine adjusting mechanism may be employed.

From the foregoing it will be seen that we have provided simple, efficient and economical means for obtaining all of the objects and advantages of the invention.

Having described our invention, we claim:

1. In a binocular stereoscopic biobjective microscope, a pair of oculars, an objective for each of said oculars and each of said objectives being optically aligned with its respective ocular, an optical system interposed between each of said oculars and its respective objective, means for adjusting certain of the optical elements of said optical system relative to other elements of said system and means actuated by said adjustment of said optical elements to change the angular relation of said objectives relative to each other to vary the degree of stereoscopic vision at which a specimen may be viewed through the microscope and for automatically adjusting the angular relation of an optical element whereby specimens may be viewed through said microscope at different degrees of stereoscopic vision without disturbing the setting of the oculars for the particular observer.

2. In a stereoscopic binocular biobjective microscope, a pair of oculars, said oculars being adjustable relative to each other to allow said oculars to be adjusted for the interpupillary distance of the user of the microscope, an optical system optically aligned with each of said oculars and including a pair of objectives with one of said objectives optically aligned with each of said oculars, said optical systems each having a reflector in fixed optical alignment with the ocular and a movable reflector optically aligned with said first reflector and said objective, means for adjusting said movable reflector means relative to said stationary reflector and means operatively connected with said means for adjusting said movable reflector to change the angular relation of said objectives relative to each other to vary the degree of stereoscopic vision through the microscope without changing the setting of the oculars for the user of the microscope.

3. In a stereoscopic binocular biobjective microscope, a pair of oculars, said oculars being adjustable relative to each other to allow said oculars to be adjusted for the interpupillary distance of the user of the microscope, an optical system including an objective optically aligned with each of said oculars, said optical systems each having a reflector in fixed alignment with its respective ocular, and an adjustable reflector means optically aligned with said fixed reflector and adjustable relative thereto, means for adjusting said adjustable reflector relative to said fixed reflector, and means operated by said means for adjusting said adjustable reflector for changing the angular relation of said objectives relative to each other to vary the degree of stereoscopic vision through the microscope without changing the setting of the oculars for the user of the microscope.

4. In a stereoscopic binocular biobjective microscope, a pair of oculars, said oculars being adjustable relative to each other to allow said oculars to be adjusted for the interpupillary distance of the user of the microscope, an optical system including an objective optically aligned with each of said oculars, said optical systems each having fixed reflector means in alignment with its respective ocular, and adjustable reflector means optically aligned with said fixed reflector means and adjustable relative thereto, means for adjusting said adjustable reflector relative to said fixed reflector, and means connected with said means for adjusting said adjustable reflector for changing the angular relation of said objectives relative to each other to vary the degree of stereoscopic vision through the microscope without changing the setting of the oculars for the user of the microscope and direct vision inverting means between said adjustable reflectors and said objectives.

5. In a stereoscopic binocular biobjective microscope, a pair of oculars, said oculars being adjustable relative to each other to allow said oculars to be adjusted for the interpupillary distance of the user of the microscope, an optical system including an objective optically aligned with each of said oculars, said optical systems each having a reflector in fixed alignment with its respective ocular, and an adjustable reflector optically aligned with said fixed reflector means and adjustable relative thereto, means for adjusting said adjustable reflector relative to said fixed reflector, and means for changing the angular relation of said objectives relative to each other to vary the degree of stereoscopic vision through the microscope without changing the setting of the oculars for the user of the microscope and optical means adjacent each objective and in optical alignment therewith and with said adjustable reflector for directing light from said objective toward said adjustable reflector.

6. In a stereoscopic binocular biobjective microscope, a pair of oculars, said oculars being adjustable relative to each other to allow said oculars to be adjusted to meet the interpupillary requirements of the user of the microscope, an optical system in optical alignment with each of said oculars, said optical systems each having a reflector in fixed alignment with its respective ocular and an adjustable reflector optically aligned with said fixed reflector, an objective optically aligned with said adjustable reflector and means for adjusting said adjustable reflector relative to said fixed reflector and means for changing the angular relation of said objectives to vary the degree of stereoscopic vision through the microscope without changing the setting of the oculars for the user of the microscope and means adjusted by the adjustment of said adjustable reflectors for retaining optical alignment between said objectives and said adjustable reflectors.

7. In a stereoscopic binocular biobjective microscope, a pair of oculars, said oculars being adjustable relative to each other to allow said oculars to be adjusted to meet the requirements of the user of the microscope, an optical system in optical alignment with each of said oculars, said optical systems each having a fixed reflector and a prism member optically aligned with an ocular and with said fixed reflector, an adjustable reflector optically aligned with said fixed reflector, an objective optically aligned with said adjustable reflector and means for adjusting said adjustable reflector relative to said fixed reflector and means for changing the relation of said objectives to vary the degree of stereoscopic vision through the microscope without changing the setting of the oculars for the user of the microscope and optical means adjacent each objective and angularly adjustable simultaneously with said objective for directing light from said objective toward said adjustable reflector.

8. A stereoscopic binocular biobjective microscope comprising a pair of oculars, a pair of objectives one for each ocular, each objective being pivotally mounted for swinging adjustment independently of its ocular on an axis transverse to its optical axis while said optical axis remains directed upon the object to be observed, and light directing means cooperating with each objective for directing light between said objective and its respective ocular, each light directing means being adjusted by movement of its respective objective to maintain the latter in optical alignment with its respective ocular.

9. A stereoscopic binocular biobjective microscope comprising a pair of oculars, a pair of objectives one for each ocular, each objective being pivotally mounted independently of its ocular for arcuate adjustment while the optical axis of each objective remains directed upon the object to be observed, the radius of said arc being the distance from the objective to the object to be observed, and light directing means cooperating with each objective for directing light between said objective and its respective ocular, and common adjusting means for arcuately swinging said objective and for maintaining its respective light directing means in optical alignment therewith and with its respective ocular.

10. A stereoscopic binocular biobjective microscope comprising a pair of oculars, a pair of objectives one for each ocular, said objectives being mounted for swinging adjustment, independently of the oculars, about substantially the same point in the plane of the material to be observed while the optical axis of each remains directed substantially upon said point, light directing means between said objectives and said oculars, and common adjusting means for simultaneously swinging said objectives and adjusting said light directing means to maintain each objective in optical alignment with its respective ocular.

11. A stereoscopic binocular biobjective microscope comprising for each eye an ocular, an objective, light directing means carried on a common mounting with said objective, means for adjusting said mounting to swing said objective about the object to be observed while the optical axis of the objective remains directed upon said object, and adjusting means actuated by said first mentioned adjusting means for maintaining said light directing means in optical alignment with said objective and with its respective ocular.

ALVA H. BENNETT.
OSCAR W. RICHARDS.